(12) United States Patent
Klein et al.

(10) Patent No.: US 11,188,503 B2
(45) Date of Patent: Nov. 30, 2021

(54) RECORD-BASED MATCHING IN DATA COMPRESSION

(71) Applicant: INTERNATIONAL BUSINESS MACHINES CORPORATION, Armonk, NY (US)

(72) Inventors: Matthias Klein, Poughkeepsie, NY (US); Damir Anthony Jamsek, Austin, TX (US); Bulent Abali, Tenafly, NJ (US); Ashutosh Misra, Lagrangeville, NY (US); Preetham M. Lobo, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 51 days.

(21) Appl. No.: 16/793,113

(22) Filed: Feb. 18, 2020

(65) Prior Publication Data
US 2021/0255999 A1   Aug. 19, 2021

(51) Int. Cl.
*G06F 16/00* (2019.01)
*G06F 16/174* (2019.01)
(Continued)

(52) U.S. Cl.
CPC ...... *G06F 16/1744* (2019.01); *G06F 11/3082* (2013.01); *G06F 16/2255* (2019.01); *G06F 16/21* (2019.01)

(58) Field of Classification Search
CPC .. G06F 16/1744; G06F 16/21; G06F 16/2255; G06F 11/3082
See application file for complete search history.

(56) References Cited

U.S. PATENT DOCUMENTS 9,853,660 B1 * 12/2017 Gopal ................. H03M 7/3086
10,187,081 B1 * 1/2019 Diamant ............. H03M 7/3088
(Continued)

OTHER PUBLICATIONS

Anonymous, "Hardware Compression Method With Early And Late Selection Of Multiple Predefined Huffma Code-Trees," IP.com No. IPCOM000238109D, Aug. 1, 2014, pp. 1-3 (+ cover sheet).
(Continued)

*Primary Examiner* — Diedra McQuitery
(74) *Attorney, Agent, or Firm* — Steven Chiu, Esq.; Blanche E. Schiller, Esq.; Heslin Rothenberg Farley & Mesiti P.C.

(57) ABSTRACT

Compression of data is facilitated by locating matches within the data to be compressed. A first technique is used to determine whether there is at least one matching string in the data to be compressed, and a second technique, different from the first technique, is used to determine whether there is at least one matching record in the data to be compressed. Based on there being at least one matching string in the data to be compressed, at least one indication of the at least one matching string is provided to an encoder to facilitate compression of the data. Further, based on there being at least one matching record in the data to be compressed, at least one indication of the at least one matching record is provided to the encoder to facilitate compression of the data. It is transparent to the encoder whether the first technique or the second technique is used to provide one or more matches.

20 Claims, 8 Drawing Sheets

(51) Int. Cl.
   *G06F 16/22*   (2019.01)
   *G06F 11/30*   (2006.01)
   *G06F 16/21*   (2019.01)

(56) References Cited

U.S. PATENT DOCUMENTS

| | | | |
|---|---|---|---|
| 10,264,256 B2 | 4/2019 | Demos et al. | |
| 10,298,470 B2 | 5/2019 | Sundaram et al. | |
| 10,326,674 B2 | 6/2019 | Sundaram et al. | |
| 10,454,498 B1* | 10/2019 | Mao | H03M 7/42 |
| 10,491,240 B1* | 11/2019 | Dupont | H03M 7/3046 |
| 2010/0293344 A1* | 11/2010 | Nishino | G11C 15/00 711/154 |
| 2011/0167173 A1* | 7/2011 | Bansal | H03M 7/30 709/247 |
| 2013/0318051 A1* | 11/2013 | Kumar | G06F 16/1748 707/692 |
| 2017/0134041 A1* | 5/2017 | Haverkamp | G06F 16/1744 |
| 2019/0065518 A1* | 2/2019 | Constantinescu | H03M 7/30 |

OTHER PUBLICATIONS

Downling, Jim et al., "D2.2—Reference Based Compression Algorithms," Jan. 10, 2014, pp. 1-90 (+ cover sheet and table of contents).

IBM, "A Method For Fast Deflate Bit Stream Parsing Using Speculation," IP.com No. IPCOM000180444D, Mar. 10, 2009, p. 1 (+ cover sheet).

IBM, "Finding Matching Data Occurrences In Large Streams," IP.com No. IPCOM000032411D, Nov. 3, 2004.

IBM, "z/Architecture—Principles of Operation," IBM Publication No. SA22-7832-11, Twelfth Edition, Sep. 2017, pp. 1-1902.

Mell, Peter and Tim Grance, "The NIST Definition of Cloud Computing," National Institute of Standards and Technology, Information Technology Laboratory, Special Publication 800-145, Sep. 2011, pp. 1-7.

Oswald, C. et al., "Hash Based Frequent Pattern Mining Approach To Text Compression," First EAI International Conference on Computer Science and Engineering, Feb. 28, 2017, pp. 1-11.

* cited by examiner

RECORD-BASED MATCHING IN DATA COMPRESSION

BACKGROUND

One or more aspects relate, in general, to processing within a computing environment, and in particular, to facilitating data compression within the computing environment.

In one or more computing environments, a compressed form of information, rather than the original, uncompressed form, is maintained on storage devices. The compressed form occupies less bytes than the original form. As a result, transmitting and maintaining a compressed form of information requires less time and space, respectively, compared to performing the same functions with the original form of the information.

In such environments, an operating system (OS) provides a mechanism to perform the compressing and decompressing operations. In one example, to provide these operations, the operating system incorporates a zlib open-source software library, which adheres to the DEFLATE standard compression technique, specified in the IETF (Internet Engineering Task Force) RFC (Request for Comments) 1951 specification. The mechanism may include a software implementation in which a user executes instructions on a general-purpose processor to perform the compressing or decompressing, or it may use a special purpose hardware implementation that is connected to an input/output (I/O) port of a system, in which an I/O device performs the operations.

Compression implementations include searching the data to be compressed to find matches in the data, such as duplicate data strings. This enables subsequent occurrences of a data string to be replaced by references to the first occurrence of the string, reducing the amount of data to be compressed.

SUMMARY

Shortcomings of the prior art are overcome and additional advantages are provided through the provision of a computer program product for facilitating processing within a computing environment. The computer program product includes at least one computer readable storage medium readable by at least one processing circuit and storing instructions for performing a method. The method includes obtaining data to be compressed by an encoder. A determination is made, using a first technique, whether there is at least one matching string in the data to be compressed, and a further determination is made, using a second technique, whether there is at least one matching record in the data to be compressed. A matching string is a string in the data that matches another string in the data, and a matching record is a record in the data that matches another record in the data. The first technique is different from the second technique. Based on the determining using the first technique that there is at least one matching string in the data to be compressed, at least one indication of the at least one matching string is provided to an encoder to facilitate compression of the data. Further, based on the determining using the second technique that there is at least one matching record in the data to be compressed, at least one indication of the at least one matching record is provided to the encoder to facilitate compression of the data. It is transparent to the encoder whether the first technique or the second technique is used to provide one or more matches.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a capability is provided to facilitate compression, and in particular, to improve a compression ratio achieved in hardware compression implementations. In performing data compression, a search is performed of the data to be compressed to determine whether there is duplicate data, such as duplicate strings of data or other subsets of data, referred to as matches. If one or more matches are found, then subsequent occurrences of the data, e.g., the duplicate string of data, after the first occurrence of that same data, are replaced by a reference to a previous occurrence (e.g., the first occurrence of the string). Therefore, individual encoding of data units (e.g., bytes) of subsequent occurrences of that string does not need to be performed; instead, reference is made to the previously compressed data string. Currently, to find matches, a hashing implementation is used; however, in accordance with an aspect of the present invention, the hashing implementation is at least complemented by an implementation that locates data matches based on record structure.

One embodiment of a computing environment to incorporate and use one or more aspects of the present invention is described with reference to FIGS. 1A-1D. In one example, the computing environment is based on the z/Architecture® hardware architecture, offered by International Business Machines Corporation, Armonk, N.Y. One embodiment of the z/Architecture hardware architecture is described in "z/Architecture Principles of Operation," IBM Publication No. SA22-7832-11, Twelfth Edition, September 2017, which is hereby incorporated herein by reference in its entirety. z/Architecture and IBM are trademarks or registered trademarks of International Business Machines Corporation in at least one jurisdiction.

Figure 1A:
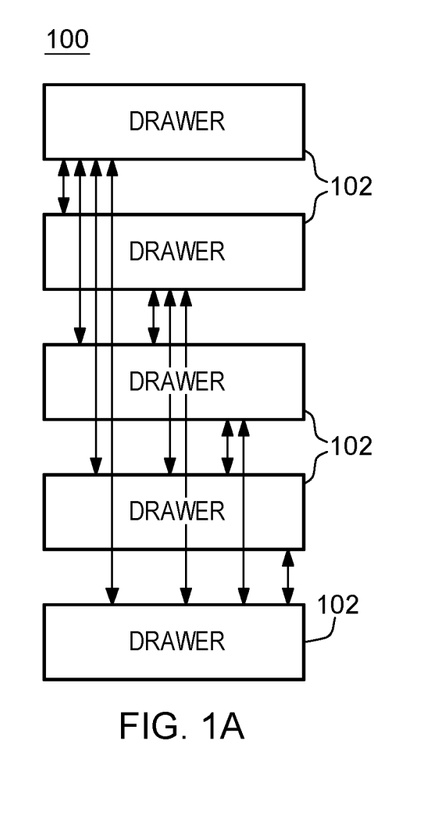
FIG. 1A depicts one example of a plurality of interconnected drawers of a computing environment to incorporate and use one or more aspects of the present invention.
Figure 1B:
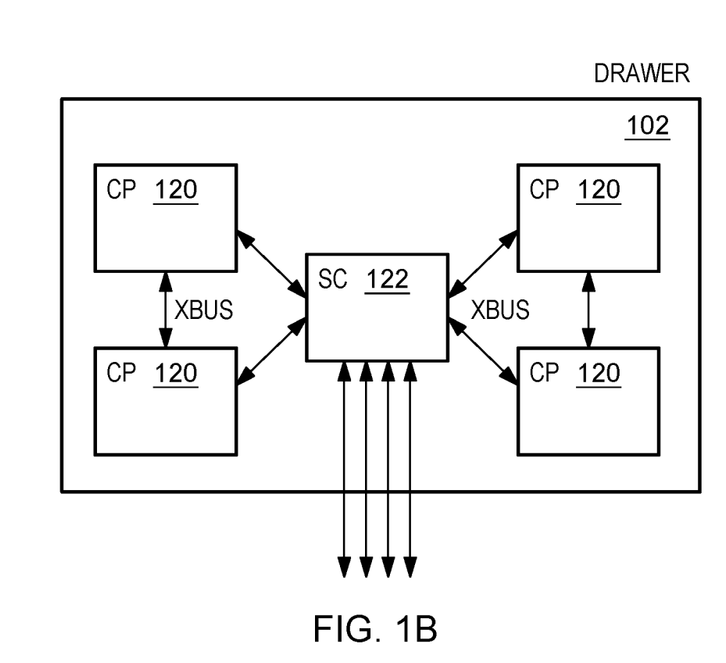
FIG. 1B depicts one example of further details of a drawer of the plurality of interconnected drawers of FIG. 1A, in accordance with one or more aspects of the present invention.

Referring to FIG. 1A, as an example, a computing environment 100 includes a plurality of interconnected drawers 102. A drawer 102, as depicted in FIG. 1B, includes a plurality of central processor (CP) chips 120 coupled to a system controller (SC) 122. System controller 122 is used to interconnect drawers of the plurality of drawers. Further details relating to a central processor chip 120 are described with reference to FIG. 1C.

Figure 1C:
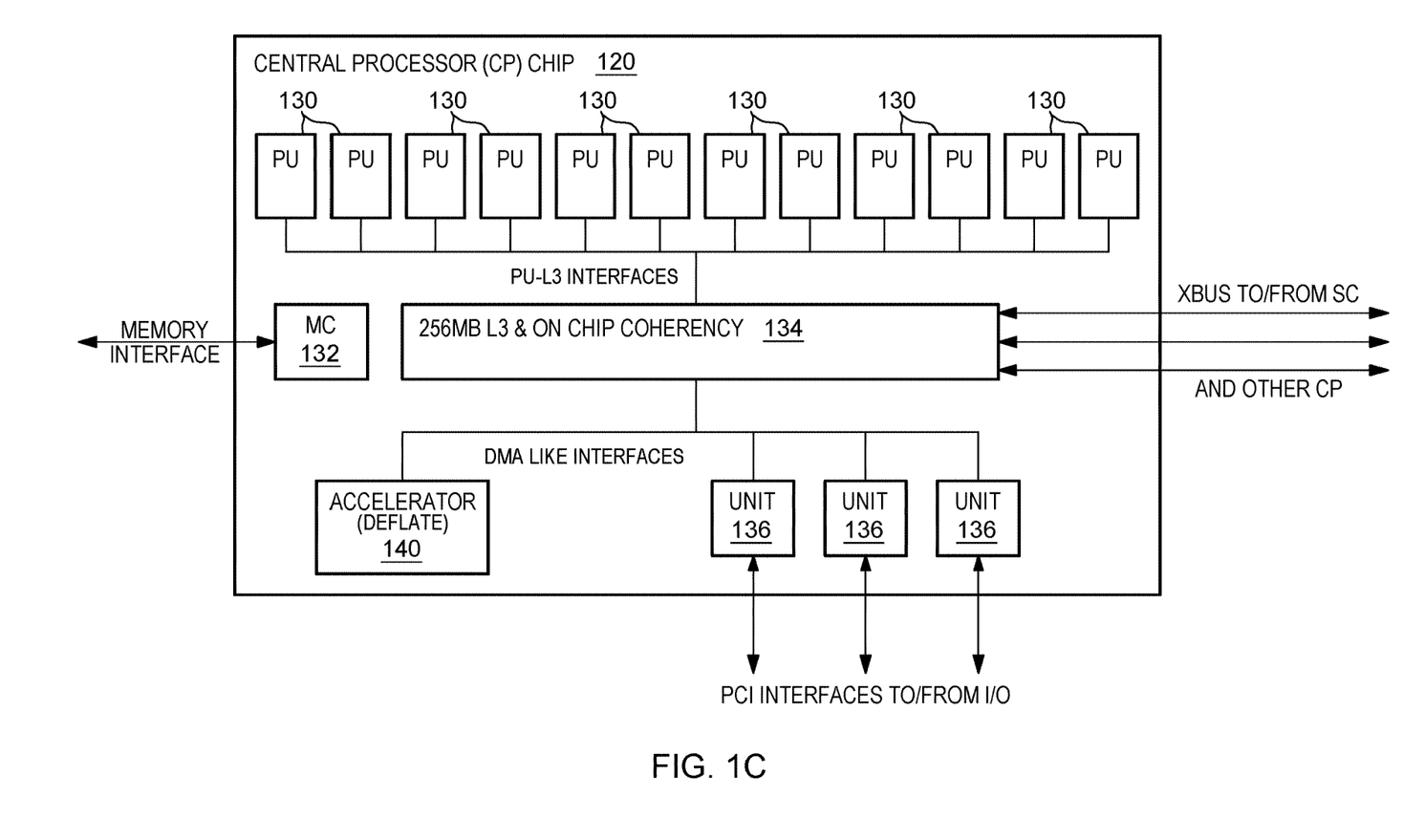
FIG. 1C depicts one example of further details of a central processor (CP) chip of the drawer of FIG. 1B, in accordance with one or more aspects of the present invention.

In one example, central processor chip 120 includes a plurality of processors (PUs or CPUs) 130 (also referred to as cores), and a memory controller 132 to control access to memory. Each of the plurality of processors includes one or more private caches, such as L1 and L2 caches, and is coupled to a shared cache 134, such as a shared L3 cache. In one example, shared cache 134 is coupled to a plurality of units 136 that couple on-chip components to PCI (Peripheral Component Interconnect) interfaces to/from input/output devices. Further, in one example, shared cache 134 is coupled to an accelerator 140 that is used, for instance, to perform particular operations (e.g., compression/decompression operations) of an instruction executing on a processor coupled thereto.

Figure 1D:
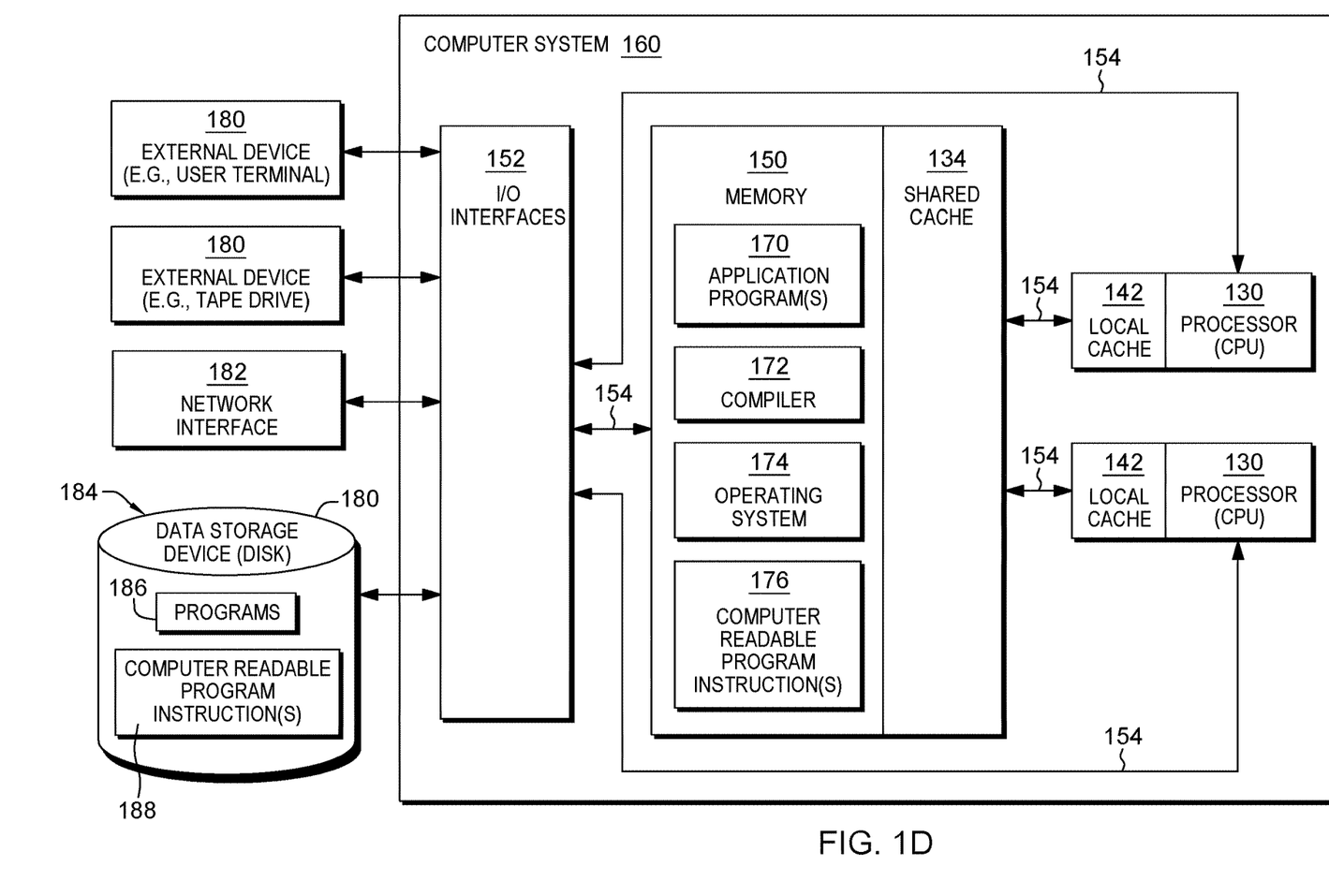
FIG. 1D depicts additional details of one example of the computing environment of FIG. 1A, in accordance with one or more aspects of the present invention.

In one example, as depicted in FIG. 1D, shared cache 134 is coupled to memory 150 (a.k.a., system memory, main memory, main storage, central storage or storage, as examples) and to local caches 142 of processors 130. Further, memory 150 and processors 130 are coupled to one or more input/output (I/O) interfaces 152 via one or more buses and/or other connections 154. The processors, memory, shared and local caches, I/O interfaces and buses are referred to herein as a computer system 160. Computer system 160 may include additional, fewer and/or different components.

Bus 154 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 150 may include one or more programs or applications 170, a compiler 172, an operating system 174 (e.g., such as a z/OS® or MVS™ (Multiple Virtual Storage) operating system, offered by International Business Machines Corporation, or other operating systems), and one or more computer readable program instructions 176. Computer readable program instructions 176 may be configured to carry out functions of embodiments of aspects of the invention. z/OS and MVS are trademarks or registered trademarks of International Business Machines Corporation in at least one jurisdiction.

Computer system 160 may also communicate via, e.g., I/O interfaces 152 with one or more external devices 180 and/or one or more network interfaces 182. Example external devices include a user terminal, data storage devices, such as a tape drive, disk or other data storage devices, a pointing device, a display, etc. In one particular example, a data storage device 184 may store one or more programs 186, one or more computer readable program instructions 188, and/or data, etc. The computer readable program instructions may be configured to carry out functions of embodiments of aspects of the invention.

Network interface 182 enables computer system 160 to communicate with one or more networks, such as a local area network (LAN), a general wide area network (WAN), and/or a public network (e.g., the Internet), providing communication with other computing devices or systems.

Computer system 160 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 160. Examples, include, but are not limited to: microcode, device drivers, redundant processing units, external disk drive arrays, RAID systems, tape drives, and data archival storage systems, etc.

Computer system 160 may be operational with numerous other general-purpose or special-purpose computing system environments or configurations. Examples of well-known computing systems, environments, and/or configurations that may be suitable for use with computer system 160 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

One or more of processors 130 of computer system 160 and/or of central processor chip 120 execute instructions, including instructions that perform compression/decompression operations. An example instruction that performs compression/decompression operations is a DEFLATE Conversion Call instruction implemented in the z/Architecture hardware architecture. The DEFLATE Conversion Call instruction performs functions related to transforming the state of data between the original (uncompressed) form of the data and a compressed representation of the data, as specified by a selected standard, such as the IETF (Internet Engineering Task Force) RFC (Request for Comments) 1951 specification, which is described in the DEFLATE Compressed Data Format Specification version 1.3 Internet Engineering Task Force, Request for Comments 1951, May 1996. The DEFLATE standard includes descriptions for compressed data symbols which represent duplicate strings in the original form of the data (in the uncompressed form of the data). Such symbols include a pointer and a length of a duplicate string which describe the location and length of the duplicate string, which was previously processed, in relationship to the current location of data being processed. The previously processed uncompressed form of the data is referred to as history. In one example, the history is a contiguous number of bytes in memory, which can be as large as, for instance, 32 K-bytes.

The DEFLATE Conversion Call instruction is a single instruction (e.g., a single architected hardware machine instruction at the hardware/software interface) that is part of a general-purpose processor instruction set architecture (ISA), which is dispatched by a program (e.g., an operating system or a user program) on the general-purpose processor. A program may execute the DEFLATE Conversion Call instruction multiple times to compress or uncompress a single data stream. For instance, when an application compresses or decompresses a large data stream (e.g., greater than 1 M-bytes), the operation may include multiple calls to compress or decompress buffered portions of the data stream.

In one embodiment, as part of compressing data using, for instance, the DEFLATE Conversion Call instruction, matches within the data are searched for and if found, the duplicate data (e.g., a duplicate string) is replaced by a reference to a previous occurrence of that duplicate data. The reference may be, for instance, a location and length of a previous occurrence; a distance (e.g., bytes or other length of data) back to the previous occurrence and a length of the previous occurrence (e.g., 40 bytes back and a length of 3 bytes); etc. One compression technique that is used that performs matching is a LZ77 technique. Most LZ77 implementations in hardware are based on hashing strings to find future matches. This is accomplished by creating a multitude of hashes based on the data being processed and storing it in a hash array. These hashes are based on hashing, e.g., the next 3 to 8 bytes starting from the current byte being processed (often in parallel) and stored into an array with a certain amount of entries per hash. When trying to find potentially matching strings in the history, the hash is used to look-up the hash table for potential matches that can then be compared against the current input data to identify actual matches.

In accordance with one or more aspects of the present invention, in addition to or in lieu of the hashing technique to identify matches, a record-based technique is used to find matches. For instance, the hardware supports a number of data structures to track a number of records. Depending on the machine, records can have different formats and the hardware may support a single format or multiple formats at the same time. For each tracked record, the hardware contains a pointer to keep track of where the record started. When attempting to find matches, the hardware looks at the tracked records. For instance, it attempts to find matches at the same relative record offset in the last record regardless of hash entries. Tracked records may be replaced based on age or some other metric (e.g., based on the data).

In one or more aspects, the record information can also (or exclusively) be used to complement the hash selection mechanisms. For example, if there are three potential matches from the hashing, the one that started at the same relative record offset may be chosen. Other possibilities also exist. Further, in one embodiment, the hardware may have additional metrics per record to increase the quality of potential matches (e.g., hashes based on record starting offset). Again, other implementations are possible. Regardless of records being used, the resulting stream is fully compatible with DEFLATE, since the compressed stream has no understanding of how matches are located.

Figure 2:
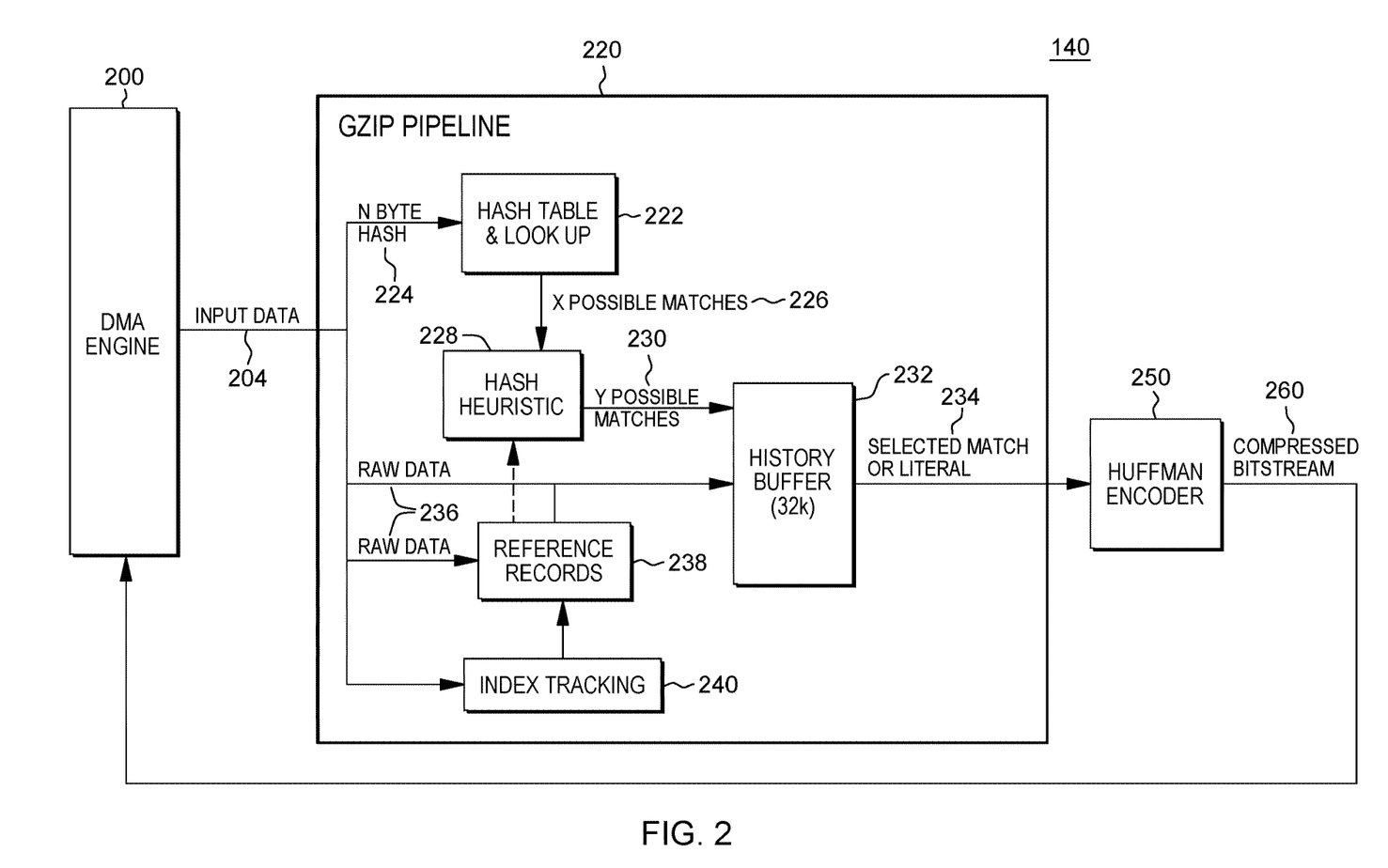
FIG. 2 depicts one example of an implementation for compression which uses hash-based matching and record-based matching to facilitate compression, in accordance with one or more aspects of the present invention.

Further details regarding a compression technique (e.g., DEFLATE) that uses multiple matching techniques, including, for instance, both hash-based and record-based matching, are described with reference to FIG. 2. In one embodiment, the matching is performed by an accelerator (e.g., accelerator 140). Accelerator 140 includes, for instance, a DMA (direct memory access) engine 200 coupled to a Huffman encoder 250 via a pipeline, such as a GZIP (GNU zip) pipeline 220. In one embodiment, input data 204 from DMA engine 200 references a hash table 222 using, for instance, an N byte hash 224 to identify X possible match locations in history (e.g., X possible matches 226). The X possible matches 226 are input to one or more hash heuristics 228 to reduce the X possible matches to Y possible matches 230 (e.g., 1 or 2), which are then compared against actual history data maintained in a history buffer 232 (e.g., a 32 k buffer). The history data is, e.g., the uncompressed form of previously processed data to be compressed. As a result of the comparison with the data in the history buffer, a symbol is produced, which represents either a match or literals (raw bytes) 234, if there was no suitable match. This is then encoded using, for instance, Huffman encoder 250 to create the actual compressed bitstream 260. The compressed bitstream is then input to DMA engine 200.

In performing the encoding, in one example, if a match is found in the data to be compressed, such as a subset or string of data that matches a previous subset or string of data in the data to be compressed (e.g., as indicated by the symbol, which may be a reference to a previous occurrence or other type of symbol; another type of indication; etc.), instead of individually encoding each data unit (e.g., byte) of the subset or string that matches the previous subset or string, reference is made to the previous data subset or string that is a match. For instance, reference is made to a previous encoding of the data, rather than repeating the encoding for the matched string.

In addition to the hash-based matching, in accordance with one or more aspects of the present invention, record-based matching is provided. This matching is based on record structure and compares records within the data to be compressed. Unlike a data string, a record has a particular structure and may be a different size (or the same size) as a subset or string of data that does not have a particular structure. In one example, a record structure includes a first x bytes indicating a size of the record and the next y bytes include the payload. Other structures are also possible. The payload may include various content, including, but not limited to, e.g., employee records; product information; location information; or any other data that is to be maintained in a particular structure; etc.

In one embodiment, the raw input data 236 (e.g., from input data 204) to be compressed is obtained (e.g., based on execution of a DEFLATE Conversion Call instruction), and is input to both history buffer 232 and to a data structure (e.g., table) of reference records 238. Reference records 238 include n number of records, which may be updated as, for instance, a first-in, first-out (FIFO) queue or via other techniques. An index tracking 240 keeps track of a location in a current record to be compared against the same location in the reference records. Multiple implementations are possible on where the reference record compare results could feed into the match finding.

Figure 3:
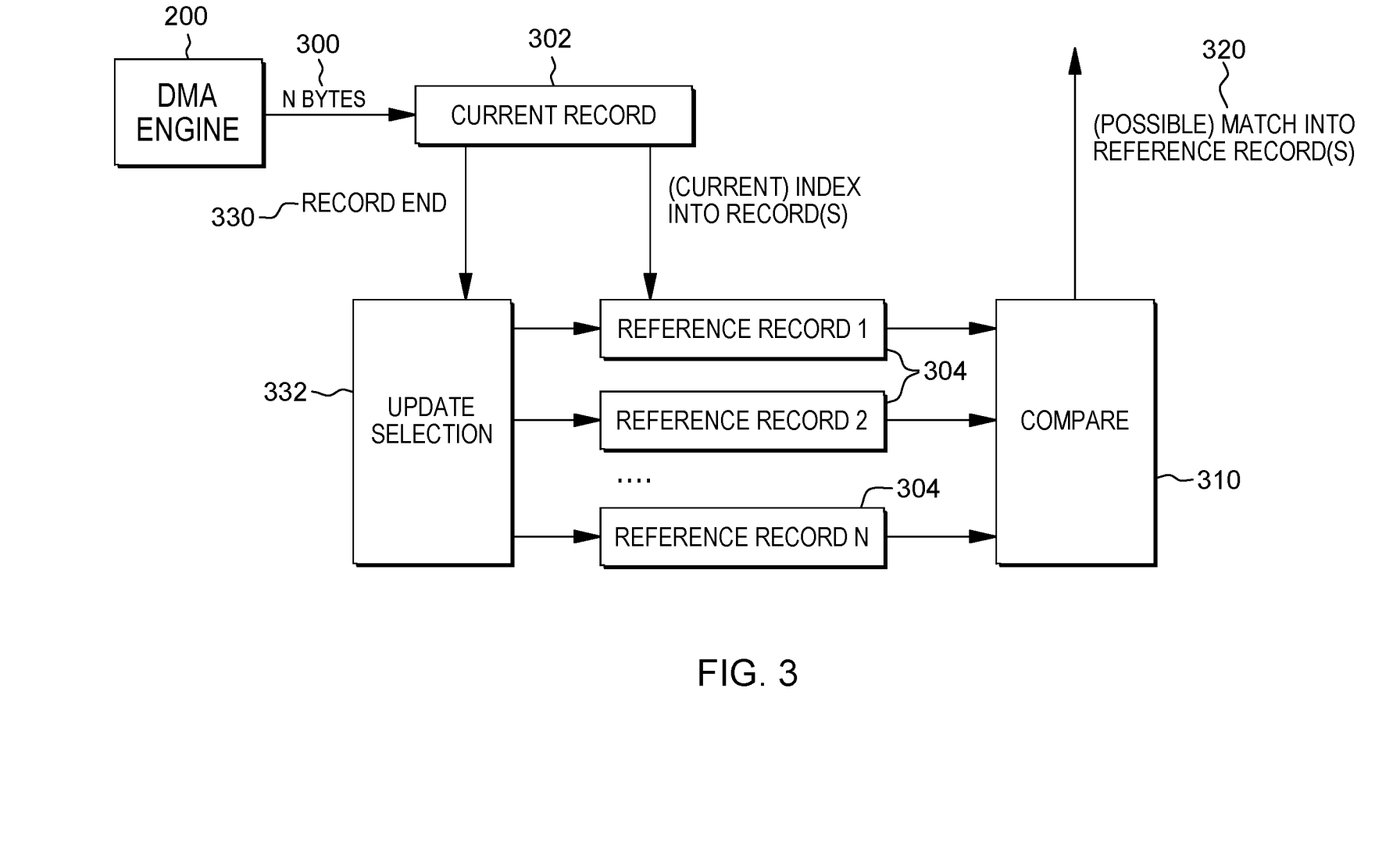
FIG. 3 depicts further details of one example of record-based matching, in accordance with one or more aspects of the present invention.

Further details of one embodiment of the record-based matching are described with reference to FIG. 3. In one example, N bytes 300 of data of a current record 302 are input from DMA engine 200. The location of the N bytes in the current record is used to index into one or more reference records 304 of reference records data structure 238. A compare 310 is performed at the indexed position of each reference record to determine if there is a match to the data at that location in the current record, which results in zero or more possible matches 320. The inputting of data of the current record, the indexing into the reference records and the comparing are performed, in one example, to the end of the record or a mismatch is found. If at the end of the record, there is match of the current record to a reference record of the reference records at, e.g., all of the indexed positions, a match is found. In one example, if a match is found (e.g., a record of data in the data to be compressed matches a previous record of data in the data to be compressed), an indication of the match is provided to the encoder (e.g., as indicated by a symbol which may be a reference to a previous record, or other type of symbol; or other type of indication; etc.), and instead of individually encoding each data unit (e.g., byte) of the record that matches the previous record, the encoder references, e.g., the previously compressed data record that is a match.

In one example, when an end 330 of the current record is reached, the reference records data structure 238 (FIG. 2) may be updated 332 with the current record. In other embodiments, this update is done periodically (e.g., after y number of current records have been processed). Other implementations are also possible.

In one or more aspects, record-based matching improves the compression ratio of compression techniques. This is achieved without requiring buffering of entire records (e.g., all of the data records in the data to be compressed) in addition to the history buffer. As a minimum, in one example, the relative record offset may be used to provide additional guidance for hash selection, with additional record-based hashes then being able to point to matches themselves.

Described herein is a capability to facilitate compression, in which a first technique (e.g., hash-based technique) and a second technique (e.g., record-based technique) are used to identify matches within the data to be compressed, such that a match need not be compressed, but instead, reference is made to the previous compression of the matched data. In the examples herein, the record-based matching is performed to complement hash-based matching. The use of record-based matching improves the compression ratio achieved in, e.g., hardware implementations by complementing existing hash-based prediction of matches with predicting matches based on record structure. However, in other embodiments, the record-based matching replaces the hash-based matching, such that the record-based matching is used exclusively. In further embodiments, the record-based matching may be used with other matching techniques, including, but not limited to, the hash-based matching. Many possibilities exist.

Various aspects are described herein. Many variations and embodiments are possible without departing from a spirit of aspects of the present invention. For instance, other instructions to perform compression/decompression may benefit from one or more aspects of the present invention. Further, compression techniques other than DEFLATE may use one or more aspects of the present invention. It should be noted that, unless otherwise inconsistent, each aspect or feature described herein, and variants thereof, may be combinable with any other aspect or feature.

One or more aspects of the present invention are inextricably tied to computer technology and facilitate processing within a computer, improving performance thereof. Embodiments of the present invention are inextricably tied to computing at least because they are directed to addressing an issue that is unique to computing (e.g., compression of data) and providing a technical approach that is also within this sphere. Given that both the issue and the approach are specific to computing, embodiments of the present invention are inextricably tied to computing.

Figure 4A:
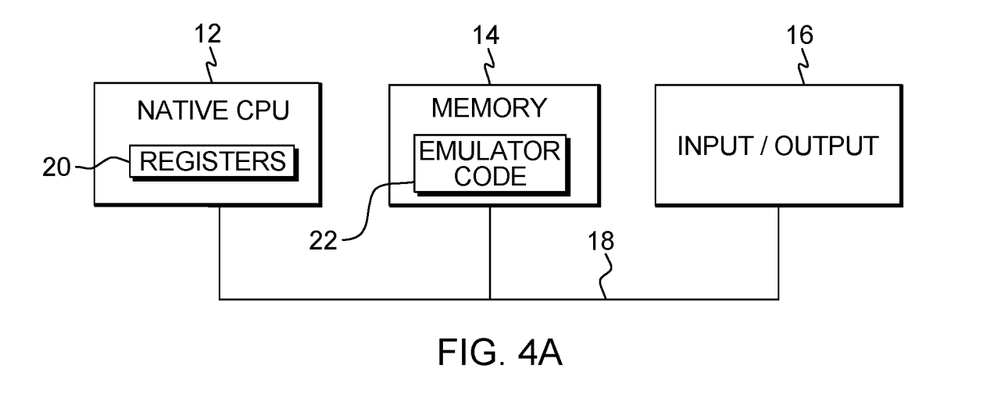
FIG. 4A depicts another example of a computing environment to incorporate and use one or more aspects of the present invention.

Other types of computing environments may also incorporate and use one or more aspects of the present invention, including, but not limited to, emulation environments, an example of which is described with reference to FIG. 4A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; and/or other machines based on architectures offered by International Business Machines Corporation, Intel Corporation, or other companies. PowerPC is a trademark or registered trademark of International Business Machines Corporation in at least one jurisdiction. Intel is a trademark or registered trademark of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, or other servers or processors, to emulate the z/Architecture hardware architecture and to execute software and instructions developed based on the z/Architecture hardware architecture.

Figure 4B:
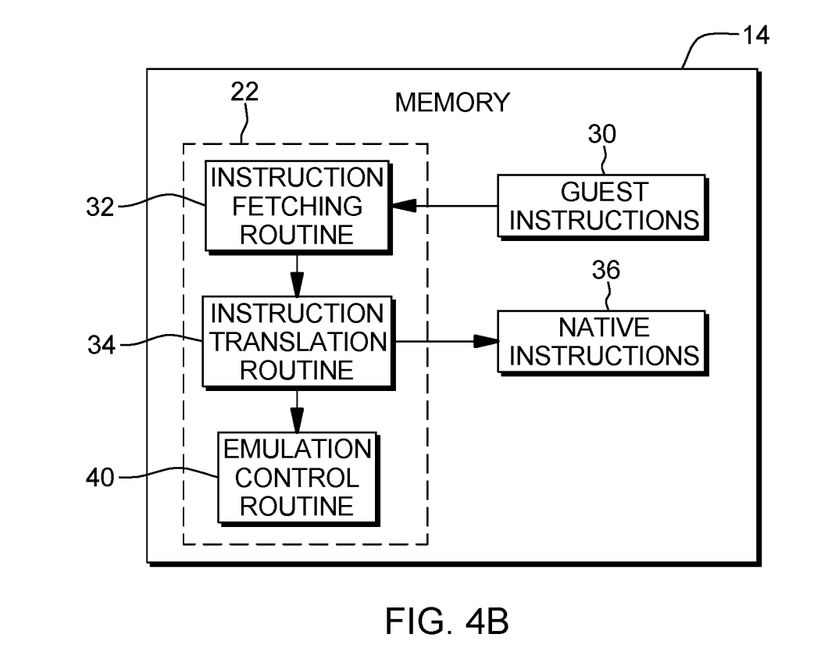
FIG. 4B depicts further details of the memory of FIG. 4A.

Further details relating to emulator code 22 are described with reference to FIG. 4B. Guest instructions 30 stored in memory 14 comprise software instructions (e.g., correlating to machine instructions) that were developed to be executed in an architecture other than that of native CPU 12. For example, guest instructions 30 may have been designed to execute on a z/Architecture processor, but instead, are being emulated on native CPU 12, which may be, for example, an Intel processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 30 that is obtained, translated and executed may be, for instance, one of the instructions described herein. The instruction, which is of one architecture (e.g., the z/Architecture hardware architecture), is fetched from memory, translated and represented as a sequence of native instructions 36 of another architecture (e.g., PowerPC, Intel, etc.). These native instructions are then executed.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
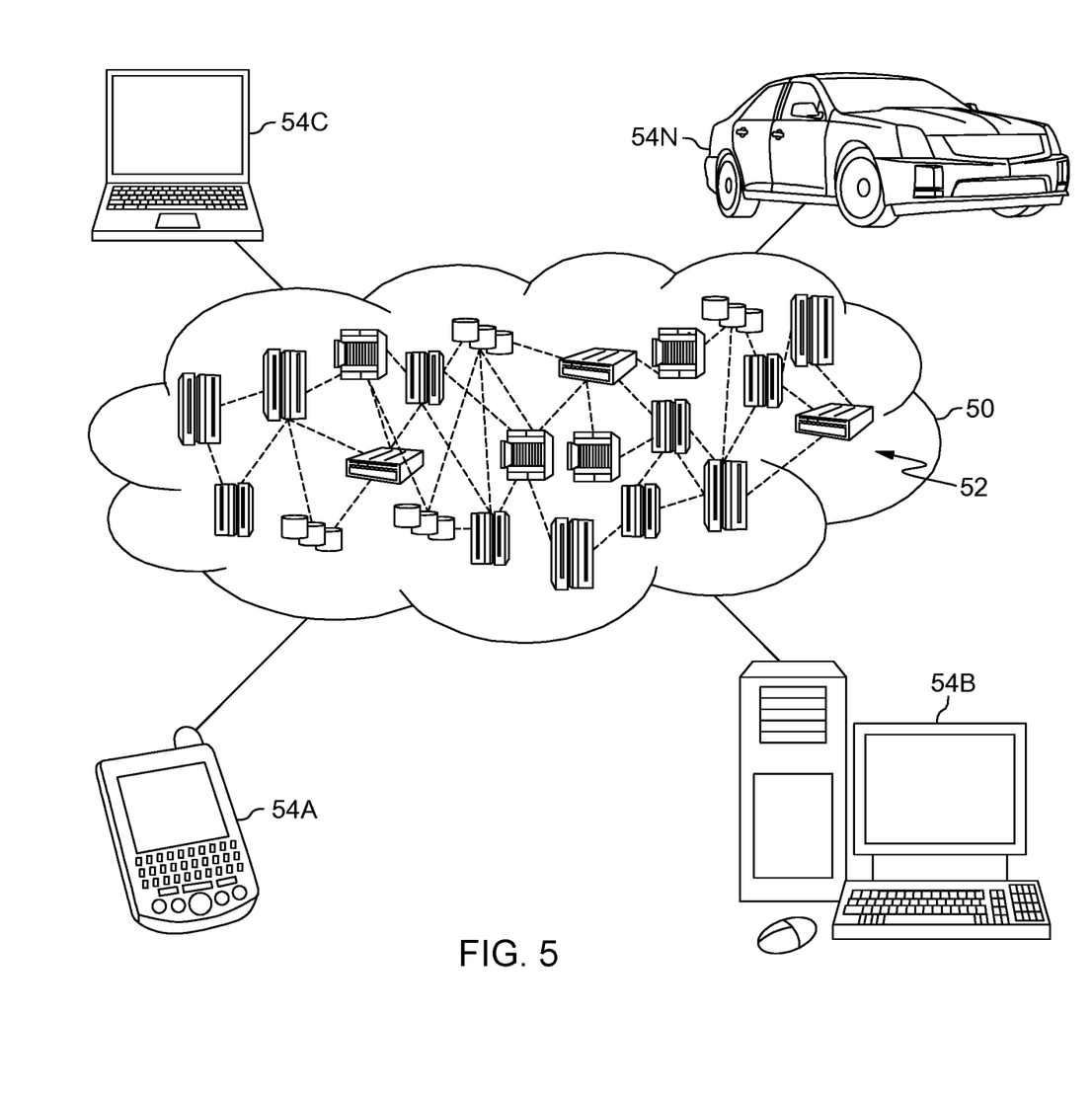
FIG. 5 depicts one embodiment of a cloud computing environment.

Referring now to FIG. 5, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 6:
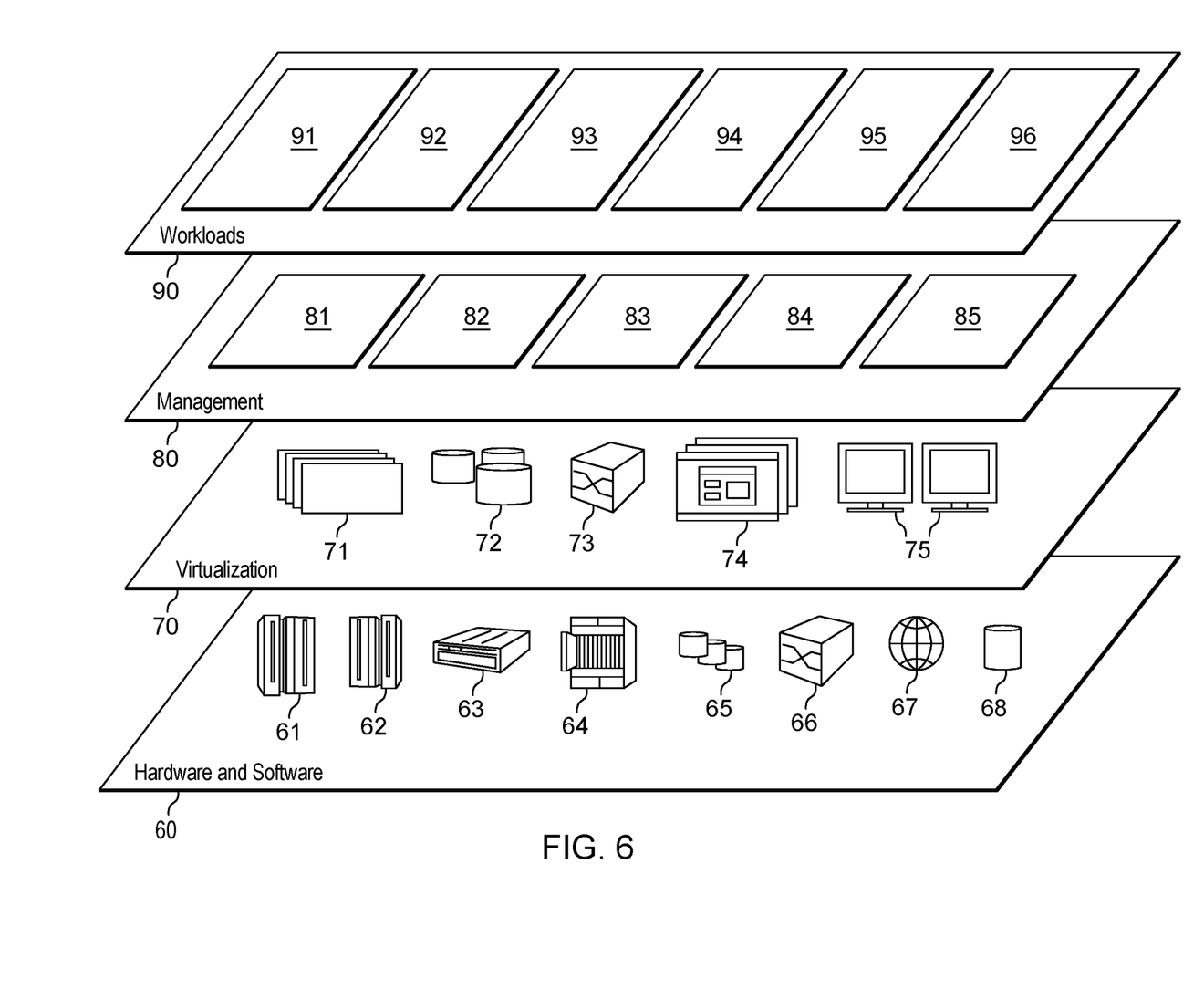
FIG. 6 depicts one example of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and matching processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Moreover, record-based matching may be used exclusively or with one or matching techniques to locate matches to facilitate compression. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
at least one computer readable storage medium readable by at least one processing circuit and storing instructions for performing a method comprising:
obtaining data to be compressed by an encoder;
determining, using a first technique, whether there is at least one matching string in the data to be compressed, wherein a matching string is a string in the data that matches another string in the data;
determining, using a second technique, whether there is at least one matching record in the data to be compressed, the first technique being different from the second technique, and wherein a matching record is a record in the data that matches another record in the data;
providing, based on determining using the first technique that there is at least one matching string in the data to be compressed, at least one indication of the at least one matching string to the encoder to facilitate compression of the data; and
providing, based on determining using the second technique that there is at least one matching record in the data to be compressed, at least one indication of the at least one matching record to the encoder to facilitate compression of the data, wherein it is transparent to the encoder whether the first technique or the second technique is used to provide one or more matches.

2. The computer program product of claim 1, wherein the first technique is a hash-based technique used to determine whether there is at least one matching string in the data.

3. The computer program product of claim 1, wherein the second technique is a record-based technique used to determine whether there is at least one matching record in the data.

4. The computer program product of claim 3, wherein the determining, using the second technique, of whether there is at least one matching record comprises:
performing record-based matching on a current record of the data to determine whether the current record is a match to a reference record of one or more reference records of the data, the performing comprising:
selecting a unit of data of the current record, the unit of data being at a selected location in the current record;
comparing the unit of data of the current record to data at the selected location in one or more reference records;
repeating the selecting and the comparing for one or more other data units of the current record, based on there being additional current record data to be compared; and
providing an indication that the current record is a match, based on the comparing indicating that the current record matches a reference record of the one or more reference records.

5. The computer program product of claim 4, wherein the selected location is indicated by index tracking that tracks where in the one or more reference records the unit of data is to be compared.

6. The computer program product of claim 4, wherein the providing the indication comprises providing a reference to the reference record that is a match for the current record, and wherein based on a compression operation to be performed on the current record, using the reference to refer to compressed data of the reference record rather than compressing the current record.

7. The computer program product of claim 6, wherein the compression operation adheres to a standard compression technique.

8. The computer program product of claim 1, wherein the first technique and the second technique are both performed based on a request to compress the data, and wherein the first technique and the second technique are performed independent of one another.

9. The computer program product of claim 1, wherein a size of a record is different than a size of a string.

10. The computer program product of claim 1, wherein the providing the at least one indication of the at least one matching string comprises providing at least one reference to at least one other string in the data that is a match for the at least one matching string, wherein based on a compression operation to be performed on the at least one matching string, using the at least one reference to refer to compressed data of the at least one other string rather than individually encoding data units of the at least one matching string; and wherein the providing the at least one indication of the at least one matching record comprises providing at least one reference to at least one other record in the data that is a match for the at least one matching record, wherein based on a compression operation to be performed on the at least one matching record, using the at least one reference to refer to compressed data of the at least one other record rather than individually encoding data units of the at least one matching record.

11. A computer system for facilitating processing within a computing environment, the computer system comprising:
a memory; and
a processor in communication with the memory, wherein the computer system is configured to perform a method, said method comprising:
obtaining data to be compressed by an encoder;
determining, using a first technique, whether there is at least one matching string in the data to be compressed, wherein a matching string is a string in the data that matches another string in the data;
determining, using a second technique, whether there is at least one matching record in the data to be compressed, the first technique being different from the second technique, and wherein a matching record is a record in the data that matches another record in the data;
providing, based on determining using the first technique that there is at least one matching string in the data to be compressed, at least one indication of the at least one matching string to the encoder to facilitate compression of the data; and
providing, based on determining using the second technique that there is at least one matching record in the data to be compressed, at least one indication of the at least one matching record to the encoder to facilitate compression of the data, wherein it is transparent to the encoder whether the first technique or the second technique is used to provide one or more matches.

12. The computer system of claim 11, wherein the first technique is a hash-based technique used to determine whether there is at least one matching string in the data.

13. The computer system of claim 11, wherein the second technique is a record-based technique used to determine whether there is at least one matching record in the data.

14. The computer system of claim 13, wherein the determining, using the second technique, of whether there is at least one matching record comprises:
  performing record-based matching on a current record of the data to determine whether the current record is a match to a reference record of one or more reference records of the data, the performing comprising:
    selecting a unit of data of the current record, the unit of data being at a selected location in the current record;
    comparing the unit of data of the current record to data at the selected location in one or more reference records;
    repeating the selecting and the comparing for one or more other data units of the current record, based on there being additional current record data to be compared; and
    providing an indication that the current record is a match, based on the comparing indicating that the current record matches a reference record of the one or more reference records.

15. The computer system of claim 11, wherein the providing the at least one indication of the at least one matching string comprises providing at least one reference to at least one other string in the data that is a match for the at least one matching string, wherein based on a compression operation to be performed on the at least one matching string, using the at least one reference to refer to compressed data of the at least one other string rather than individually encoding data units of the at least one matching string; and wherein the providing the at least one indication of the at least one matching record comprises providing at least one reference to at least one other record in the data that is a match for the at least one matching record, wherein based on a compression operation to be performed on the at least one matching record, using the at least one reference to refer to compressed data of the at least one other record rather than individually encoding data units of the at least one matching record.

16. A computer-implemented method of facilitating processing within a computing environment, the computer-implemented method comprising:
  obtaining data to be compressed by an encoder;
  determining, using a first technique, whether there is at least one matching string in the data to be compressed, wherein a matching string is a string in the data that matches another string in the data;
  determining, using a second technique, whether there is at least one matching record in the data to be compressed, the first technique being different from the second technique, and wherein a matching record is a record in the data that matches another record in the data;
  providing, based on determining using the first technique that there is at least one matching string in the data to be compressed, at least one indication of the at least one matching string to the encoder to facilitate compression of the data; and
  providing, based on determining using the second technique that there is at least one matching record in the data to be compressed, at least one indication of the at least one matching record to the encoder to facilitate compression of the data, wherein it is transparent to the encoder whether the first technique or the second technique is used to provide one or more matches.

17. The computer-implemented method of claim 16, wherein the first technique is a hash-based technique used to determine whether there is at least one matching string in the data.

18. The computer-implemented method of claim 16, wherein the second technique is a record-based technique used to determine whether there is at least one matching record in the data.

19. The computer-implemented method of claim 18, wherein the determining, using the second technique, of whether there is at least one matching record comprises:
  performing record-based matching on a current record of the data to determine whether the current record is a match to a reference record of one or more reference records of the data, the performing comprising:
    selecting a unit of data of the current record, the unit of data being at a selected location in the current record;
    comparing the unit of data of the current record to data at the selected location in one or more reference records;
    repeating the selecting and the comparing for one or more other data units of the current record, based on there being additional current record data to be compared; and
    providing an indication that the current record is a match, based on the comparing indicating that the current record matches a reference record of the one or more reference records.

20. The computer-implemented method of claim 16, wherein the providing the at least one indication of the at least one matching string comprises providing at least one reference to at least one other string in the data that is a match for the at least one matching string, wherein based on a compression operation to be performed on the at least one matching string, using the at least one reference to refer to compressed data of the at least one other string rather than individually encoding data units of the at least one matching string; and wherein the providing the at least one indication of the at least one matching record comprises providing at least one reference to at least one other record in the data that is a match for the at least one matching record, wherein based on a compression operation to be performed on the at least one matching record, using the at least one reference to refer to compressed data of the at least one other record rather than individually encoding data units of the at least one matching record.

* * * * *